(12) United States Patent
Frantzen et al.

(10) Patent No.: US 10,870,319 B2
(45) Date of Patent: Dec. 22, 2020

(54) PNEUMATIC TIRE WITH POST CURE SEALANT LAYER

(71) Applicant: The Goodyear Tire & Rubber Company, Akron, OH (US)

(72) Inventors: Andreas Frantzen, Trier (DE); Frida Nzulu, Rollingen (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 363 days.

(21) Appl. No.: 15/987,966

(22) Filed: May 24, 2018

(65) Prior Publication Data
US 2019/0359013 A1 Nov. 28, 2019

(51) Int. Cl.
*B60C 19/12* (2006.01)
*B29D 30/06* (2006.01)
(Continued)

(52) U.S. Cl.
CPC ........ *B60C 19/122* (2013.01); *B29D 30/0685* (2013.01); *C08K 3/22* (2013.01);
(Continued)

(58) Field of Classification Search
CPC .............. B60C 19/122; B29D 30/0685; B29D 2030/0686; C08K 2003/2206; C08K 2003/222; C08K 2003/2296
See application file for complete search history.

(56) References Cited

U.S. PATENT DOCUMENTS 2,619,481 A    11/1952   Baldwin et al.
2,822,342 A     2/1958   Ford et al.
(Continued)

FOREIGN PATENT DOCUMENTS

DE         2639391 A1    3/1978
DE   102016219668 A1    4/2018
(Continued)

OTHER PUBLICATIONS

Gan, Vulcanization of Butyl Rubber by p-Quinone Dioxime, Vulcanization of Butyl Rubber by p-Quinone Dioxime, 1977, pp. 1771-1781, vol. 21, Journal of Applied Polymer Science.

(Continued)

*Primary Examiner* — Nicholas E Hill
(74) *Attorney, Agent, or Firm* — John D. DeLong

(57) ABSTRACT

The present invention is directed to a method making a pneumatic tire, comprising the steps of: mixing a sealant composition comprising an elastomer, a filler, a diluent, a quinoid curing agent, an oxidant co-curative; and a cure modifier of formula 1:

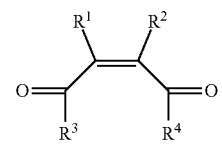

wherein $R^1$ and $R^2$ are independently H or C1 to C4 alkyl, or $R^1$ and $R^2$ taken together form a substituted or unsubstituted phenylene group; $R^3$ and $R^4$ are independently H, $-NH_2$, C1 to C4 alkyl, or $-OR^5$ where $R^5$ is C1 to C4 alkyl, with the proviso that when $R^1$ and $R^2$ are taken together to form a substituted or unsubstituted phenylene group, $R^5$ is C1 to C3 alkyl; applying the sealant composition to an inner surface of a cured tire; and curing the sealant composition.

16 Claims, 2 Drawing Sheets

(51) Int. Cl.

| | |
|---|---|
| C08K 3/22 | (2006.01) |
| C08K 5/053 | (2006.01) |
| C08K 5/08 | (2006.01) |
| C08K 5/092 | (2006.01) |
| C08K 5/11 | (2006.01) |
| C08K 5/14 | (2006.01) |
| C08K 5/17 | (2006.01) |
| C08L 7/02 | (2006.01) |
| C08L 9/02 | (2006.01) |
| C08L 9/06 | (2006.01) |

(52) U.S. Cl.
CPC ............... *C08K 5/053* (2013.01); *C08K 5/08* (2013.01); *C08K 5/092* (2013.01); *C08K 5/11* (2013.01); *C08K 5/14* (2013.01); *C08K 5/17* (2013.01); *C08L 7/02* (2013.01); *C08L 9/02* (2013.01); *C08L 9/06* (2013.01); *B29D 2030/0686* (2013.01); *C08K 2003/222* (2013.01); *C08K 2003/2206* (2013.01); *C08K 2003/2296* (2013.01)

(56) References Cited

U.S. PATENT DOCUMENTS

| | | | | |
|---|---|---|---|---|
| 3,324,040 | A | * | 6/1967 | Spoor ................... C11D 3/3945 |
| | | | | 252/186.2 |
| 3,330,871 | A | | 7/1967 | Mageli |
| 3,846,370 | A | | 11/1974 | Bunk et al. |
| 3,881,537 | A | * | 5/1975 | Miyazato ........... B29D 30/0685 |
| | | | | 152/504 |
| 4,068,027 | A | | 1/1978 | Van Ornum |
| 4,214,619 | A | | 7/1980 | Bowerman, Jr. et al. |
| 4,289,805 | A | * | 9/1981 | Dubow ................... B29C 73/16 |
| | | | | 427/140 |
| 4,426,468 | A | | 1/1984 | Ornum et al. |
| 4,539,344 | A | | 9/1985 | Ornum et al. |
| 4,616,048 | A | | 10/1986 | De Trano et al. |
| 5,880,181 | A | | 3/1999 | Torenbeek et al. |
| 6,194,485 | B1 | | 2/2001 | Hogan et al. |
| 6,204,321 | B1 | | 3/2001 | Lanoye |
| 6,303,694 | B1 | | 10/2001 | Hogan et al. |
| 8,293,049 | B2 | | 10/2012 | Incavo |
| 8,821,982 | B2 | | 9/2014 | Sostmann et al. |
| 2010/0119715 | A1 | | 5/2010 | Sostmann et al. |
| 2011/0291045 | A1 | * | 12/2011 | Gravelle ............. B01F 17/0007 |
| | | | | 252/182.14 |
| 2012/0199260 | A1 | | 8/2012 | Merino Lopez et al. |
| 2016/0185052 | A1 | * | 6/2016 | Okamatsu ................ C08L 7/00 |
| | | | | 523/166 |
| 2017/0151740 | A1 | | 6/2017 | Helfen et al. |
| 2017/0297281 | A1 | * | 10/2017 | Yukawa ................... B29C 73/22 |
| 2017/0305210 | A1 | | 10/2017 | Yukawa et al. |

FOREIGN PATENT DOCUMENTS

| | | | |
|---|---|---|---|
| EP | 3199382 A4 | 8/2017 | |
| EP | 3263359 A1 | 1/2018 | |
| EP | 3009473 B1 | 3/2018 | |
| WO | WO-2016060235 A1 * | 4/2016 | .......... B60C 19/122 |
| WO | 2018141454 A1 | 8/2018 | |

OTHER PUBLICATIONS

Ghatge, The Vulcanization of Styrene-Butadiene Rubber with 2-Pentadecyl-Benzoquinone Dioxime, The Vulcanization of Styrene-Butadiene Rubber with 2-Pentadecyl-Benzoquinone Dioxime, 1979, pp. 353-360, vol. 52, Iss. 2, Rubber Chem Tech.

Klyuchnikov, Specific Features of Vulcanization of Unsaturated Rubbers with Polymer, Specific Features of Vulcanization of Unsaturated Rubbers with Polymer, 2004, pp. 1708-1710, Vo. 77, Iss. 10, Russian Journal of Applied Chemistry.

Kight, A Rationalization of Nitosarene-Olefin Reactionsq, A Rationalization of Nitosarene-Olefin Reactions, 1971, pp. 6201-6208, vol. 27, Pergamon Press.

Rehner, Vulcanization Reactions in Butyl Rubber, Vulcanization Reactions in Butyl Rubber, 1946, pp. 500-506, vol. 38, Iss. 5, Ind. Eng. Chem.

European Search Report for Serial No. 19174969.6 dated Sep. 23, 2019.

* cited by examiner

PNEUMATIC TIRE WITH POST CURE SEALANT LAYER

BACKGROUND

Various methods, sealants and tire constructions have been suggested for pneumatic tires relating to the use of liquid sealant coatings in which the sealant flows into a puncture hole. However, such liquid sealants can flow excessively at elevated temperatures and cause the tire to become out of balance. Also, the liquid sealant may not be entirely operable or effective over a wide temperature range extending from summer to winter conditions. More complicated tire structures which encase a liquid sealant in a vulcanized rubber material can be expensive to manufacture and can also create balance and suspension problems due to the additional weight required in the tire.

Puncture sealing tires also have been further proposed wherein a sealant layer of degradable butyl based rubber, for example, is assembled between unvulcanized tire layers to provide a built-in sealant. By laminating the sealant layer between two or more non-degraded rubber layers, e.g., the tire inner liner and a tire carcass, the sealant layer retains its structural integrity during the vulcanization operation where high pressures are applied to the tire, which would otherwise displace the degraded rubber layer from its desired location. However, the compounds that typically are used in the built-in sealant, e.g., organic peroxide depolymerized butyl based rubber, can generate gases at higher temperature, such as during the tire cure or during tire use, which can result in aesthetically unappealing inner liner blister formation. Aside from being unappealing, such blister formation may allow the sealant to unfavorably migrate away from its intended location. To combat blister formation, the inner liner, for example, can be provided at an increased thickness but this can add to the cost of building a tire.

It is also known to directly apply sealant layers to tires after the cure process, or post cure. Such sealant layers generally are adhesively secured to the exposed surface of the innermost inner liner, and may be tacky and gel-like. Such post cure sealants as known in the art may not provide adequate long-term seal against puncturing objects such as nails and the like.

Accordingly, there is a need for an improved post cure sealant layer for tires.

SUMMARY

The present invention is directed to a method making a pneumatic tire, comprising the steps of: mixing a sealant composition comprising an elastomer, a filler, a diluent, a quinoid curing agent, an oxidant co-curative; and a cure activator of formula 1:

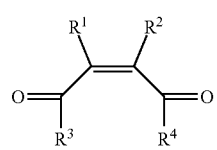

wherein $R^1$ and $R^2$ are independently H or C1 to C4 alkyl, or $R^1$ and $R^2$ taken together form a substituted or unsubstituted phenylene group; $R^3$ and $R^4$ are independently H, —OH —NH$_2$, C1 to C4 alkyl, or —OR$^5$ where $R^5$ is C1 to C4 alkyl, with the proviso that when $R^1$ and $R^2$ are taken together to form a substituted or unsubstituted phenylene group, $R^5$ is C1 to C3 alkyl; applying the sealant composition to an inner surface of a cured tire; and curing the sealant composition.

DRAWINGS

DESCRIPTION

There is disclosed a method making a pneumatic tire, comprising the steps of: mixing a sealant composition comprising an elastomer, a filler, a diluent, a quinoid curing agent, an oxidant co-curative; and a cure activator of formula 1:

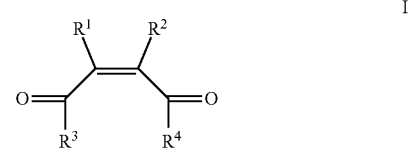

wherein $R^1$ and $R^2$ are independently H or C1 to C4 alkyl, or $R^1$ and $R^2$ taken together form a substituted or unsubstituted phenylene group; $R^3$ and $R^4$ are independently H, —OH —NH$_2$, C1 to C4 alkyl, or —OR$^5$ where $R^5$ is C1 to C4 alkyl, with the proviso that when $R^1$ and $R^2$ are taken together to form a substituted or unsubstituted phenylene group, $R^5$ is C1 to C3 alkyl; applying the sealant composition to an inner surface of a cured tire; and curing the sealant composition.

Figure 1:
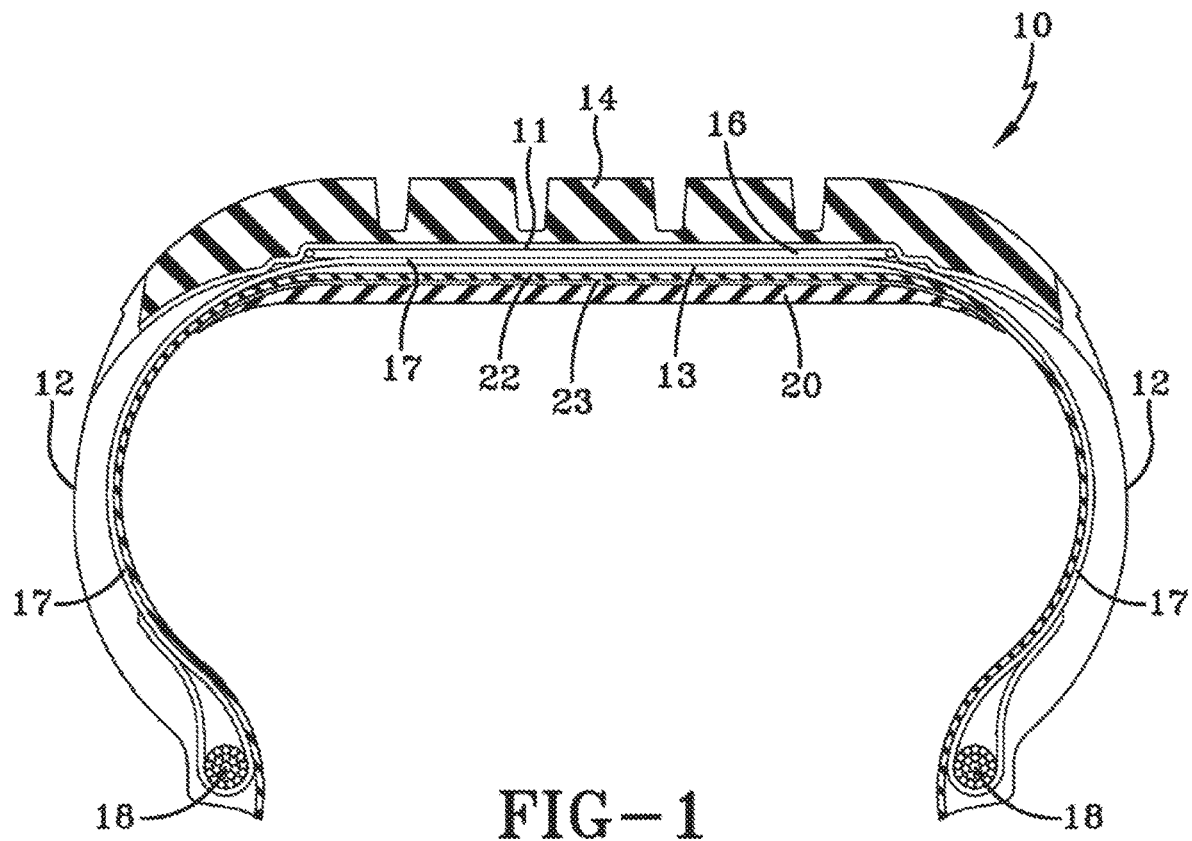
FIG. 1 shows a cross-sectional view of a pneumatic tire which contains a circumferential sealant layer which contains a post tire cure applied sealant layer adhered to the innerliner.

In FIG. 1, a cross-section of a cured pneumatic tire 10 is presented comprised of a tread 14 which includes a tread base rubber layer 11, sidewalls 12, spaced apart beads 18 and carcass underlying the tread 14 (including the tread base layer 11), comprised of cord reinforced (e.g. wire cord reinforced) rubber belt plies 16, cord reinforced (e.g. synthetic nylon or polyester cord reinforced) rubber carcass ply 17 and an optional rubber barrier layer 13 with inner liner rubber layer 22 being positioned radially inward of the carcass and optional barrier layer 13 and carcass ply 17 together with a sealant layer 20 forming the radially innermost surface of the tire.

The sealant layer is formed of a composition having the general components as shown in Table 1.

TABLE 1

| Material | Percent (wt.) |
| --- | --- |
| Elastomer | 10-50% |
| Filler | 0-30% |
| Diluent | 10-80% |
| Quinoid curing agent | 0.5-5% |
| Basic oxide (ZnO, MgO, CaO) | 0-5% |

TABLE 1-continued

| Material | Percent (wt.) |
|---|---|
| Peroxide | 1-15% |
| Cure activator of formula 1 | 1-10% |

Suitable cure activators of formula 1 include phthalic acid, monoalkyl phthalates, dialkyl phthalates such as dimethyl phthalate, diethylphthalate, and dipropylphthalate, phthalic acid monoamides, phthalic acid diamides, phthalaldehyde, and o-diacetylbenzene; maleic acid, monoalkyl maleates, dialkyl maleates such as dimethylmaleate, diethylmaleate, dipropylmaleate, and dibutylmaleate, maleic acid monoamides, maleic acid diamides, citraconic acid, monoalkyl citraconate, dialkyl citraconates, citraconic acid monoamides, citraconic acid diamides, and 2-butenedial-2Z; trimellitic acid, monoalkyl trimellitates, dialkyltrimellitates, trialkyltrimellitates, hemimellitic acid, monoalkyl hemimellitates, dialky hemimellitates, trialkyl hemimellitates, pyromellitic acid, monoalkyl pyromellitates, dialkyl pyromellitates, trialkyl pyromellitates, and tetraalkyl pyromellitates.

The sealant layer includes an elastomer. Suitable elastomers include isoprene-isobutylene-rubber (Butyl rubber, IIR), halogenated isoprene-isobutylene-rubber (HIIR), ethylene-propylene-diene-terpolymer (EPDM), styrene-butadiene copolymer (SBR), acrylonitrile-butadiene copolymer (AB), acrylonitrile-butadiene-styrene copolymer (ABS), polybutadiene, natural rubber, cis polyisoprene, and combinations thereof. Suitable elastomers generally having a molecular weight Mn between 100 kDa and 500 kDa. Molecular weight Mn may be determined by methods known in the art, such as by gel permeation chromatography following ASTM D3536 or equivalent.

In one embodiment, the sealant layer includes a butyl rubber. As used herein the term "butyl rubber" is defined to mean a polymer predominately comprised of repeat units of isobutylene but including a few repeat units of a conjugated diene. Preferably from about 85% to about 99.5% by weight of the butyl rubber are repeat units derived from the polymerization of isobutylene, while from about 0.1% to about 15% by weight of the repeat units are derived from a conjugated diene having from 4 to 8 carbon atoms such as butadiene, isoprene, hexadiene, etc., with isoprene being preferred.

The sealant layer also includes a diluent. Suitable diluents include low molecular weight elastomers with a number average molecular weight Mn ranging from 200 to 5,000. Low molecular weight elastomers include low molecular weight polyisoprene, polybutenes including polyisobutylene, polybutadiene, butyl rubber, and the like. Other diluents include oils and resins. Molecular weight Mn may be determined by methods known in the art, such as by gel permeation chromatography following ASTM D3536 or equivalent.

In one embodiment, the diluent is a polybutene. By polybutene, it is meant a polymer of one or more butene isomers including 1-butene, 2-butene, and 2-methylpropene (isobutylene).

Such polybutene may be commercially referred to as polyisobutylene. Such polybutenes preferably have a number average molecular weight exceeding about 600 to minimize the possibility of migration from the sealant layer into adjacent tire components. It is preferably prepared by polymerizing an isobutylene rich stream with a metal halide catalyst and preferably has a polymer backbone structure resembling polyisobutylene. Very suitable polybutenes are available under the trademark Indopol. In one embodiment, the number average molecular weights (Mn) of the polybutene from about 600 to about 2500, as determined by vapor pressure osmometry.

Oils may be included in the sealant as a diluent. Suitable oils include oils such as mineral oils including but not limited to aromatic oils, naphthenic oils, paraffinic oils, MES oils, TDAE oils, RAE oils, and SRAE oils, and vegetable oils including but not limited to sunflower oil, soybean oil, corn oil, castor oil, and canola oil. Oil may be present in an amount ranging from 5 to 15 phr.

Resins may also be included in the sealant as a diluent. Suitable resins include hydrocarbon resins, phenol/acetylene resins, rosin derived resins and mixtures thereof. Representative hydrocarbon resins include coumarone-indene-resins, petroleum resins, terpene polymers and mixtures thereof.

Crosslinking of the elastomer constituents in the sealant may be effected by one of the known quinoid systems. In the quinoid curing system, benzoquinone dioxime and p,p-dibenzoylquinone dioxime are preferred as the curing agents. Other suitable curing agents include dibenzoyl-p-quinone dioxime, p-dinitrosobenzene and N-methyl-N, 4-dinitrosoanilene. The crosslinking activators which may be employed in the sealant composition include organic peroxides (including diaroyl peroxides, diacyl peroxides and peroxyesters. In one embodiment, the curing agent/crosslinking activator combination is benzoquinone dioxime and benzoyl peroxide combination.

Other conventional compounding ingredients may be included in the mixing process, including but not limited to filler such as carbon black and silica, antidegradants, colorants, processing aids, and the like.

In addition to the cure accelerator of formula 1, the sealant composition may also include a cure retarder selected from ethylene glycol, alkyl-substituted ethylene glycols, ethylene diamine, and alkyl-substituted ethylene diamines. Suitable cure retarders include ethylene glycol, propylene glycol (i.e., α-propylene glycol), ethylene diamine, methyl ethylene diamine, N, N-dimethyl ethylene diamine, and 1,2-dimethyl ethylene diamine. The cure retarder may be used in the same amount range as the cure accelerator.

Mixing of the sealant composition may be accomplished for example by combining the elastomers and other components in a rubber mixer such as a Brabender internal mixer, extruder, conical mixer, or the like. A suitable process for mixing the sealant and applying to a tire innerliner is as disclosed for example in U.S. Pat. No. 8,821,982.

Following mixing and cure, the sealant composition is applied to the innerliner of a cured tire. Prior to application of the sealant, the tire innerliner may be cleaned of surface impurities to improve adhesion of the sealant to the innerliner surface. In one embodiment, the innerliner surface is cleaned using a laser technique as described in US 2017/0151740.

Figure 2:
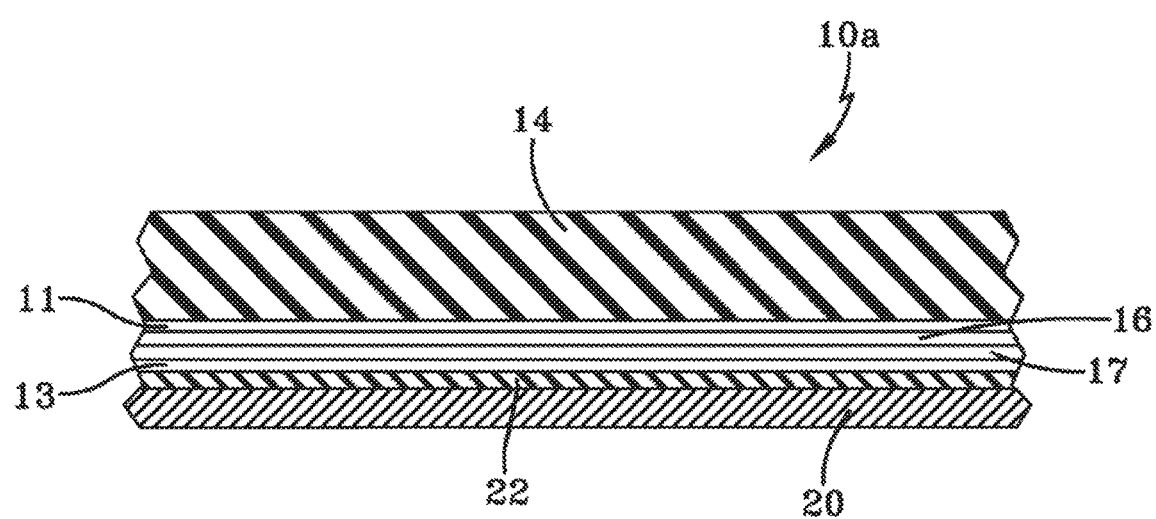
FIG. 2 shows a partial cross-sectional view of a portion of the tire with a post-tire cure applied sealant layer.

FIG. 2 depicts a partial cross-section of the sulfur cured pneumatic tire 10, labeled as 10a in FIG. 2, comprising the tire tread 14 with its tread base rubber layer 11, wire cord reinforced rubber belt plies 16, carcass with synthetic cord reinforced rubber carcass ply 17 (e.g. synthetic fiber based cord such as, for example, nylon or polyester cord), optional rubber barrier layer 13, rubber inner liner 22 and sealant layer 20. The sealant layer 20 is applied to the inner liner 22 of the already cured tire (and is therefore a post tire cure applied sealant layer) to provide a tire with a sealant layer with puncture sealing properties against various puncturing objects.

The thickness of the circumferential sealant layer 20 can vary depending somewhat upon the degree of sealing ability desired as well as the tire itself, including the tire size and intended tire use. For example, the thickness of the sealant layer may range from about 0.13 cm (0.05 inches) to about 1.9 cm (0.75 inches) depending somewhat upon the tire itself and its intended use. For example, in passenger tires, the sealant layer 20 might, for example, have a thickness in a range of about 0.33 cm (0.125 inches) whereas for truck tires, the sealant layer 20 might, for example, have a thickness in a range of about 0.76 cm (0.3 inches). The post cured tire applied sealant layer 20 is generally situated in the crown region of the tire 10, and, if desired, may include colorant so that it is of a non-black color that may contrast with the black colored inner liner, tread, or sidewall so that a tire puncture can be noticed.

The tire inner liner rubber layer 22 may be comprised of a conventional sulfur curable rubber inner liner for use in pneumatic tires. In one example, the rubber innerliner 22 can be a sulfur curative-containing halobutyl rubber composition of a halobutyl rubber such as for example chlorobutyl rubber or bromobutyl rubber. Such halobutyl rubber based inner liner layer may also contain one or more sulfur curable diene-based elastomers such as, for example, cis-1,4-polyisoprene natural rubber, cis-1,4-polybutadiene rubber and styrene/butadiene rubber, or mixtures thereof. The inner liner 22 is normally prepared by conventional calendering or milling techniques to form a strip of uncured compounded rubber of appropriate width. When the tire 10 is cured, the inner liner 22 becomes co-cured and thereby integral with, the tire 10. Tire inner liner rubber layers and their methods of preparation are well known to those having skill in such art.

Example 1

In this example, the effect of several cure modifiers on the cure of a tire sealant composition is illustrated. Four sealant compositions were mixed in a laboratory mixer using amounts as indicated in Table 2, with amounts given in weight percent. The mixed samples were tested for cure characteristics including minimum and maximum torque (Smin, Smax), delta torque (Smax-Smin) and T points with results given in Table 3 and FIG.-3. Such "T-points" (i.e., T90, T25, T80, etc.) represent vulcanization states, are recognizable to one skilled in the art and are defined in ASTM D2084, D5289 and ISO 6502 and are fully described in a presentation given by H. G. Buhrin at Tyretech '90 in Brighton, England, Nov. 5-6, 1990. The torque and T-points were determined using the Flexsys Rubber Process Analyzer (RPA) 2000. A description of the RPA 2000, its capability, sample preparation, tests and subtests can be found in these references. H A Pawlowski and J S Dick, Rubber World, June 1992; J S Dick and H A Pawlowski, Rubber World, January 1997; and J S Dick and J A Pawlowski, Rubber & Plastics News, Apr. 26 and May 10, 1993.

Figure 3:
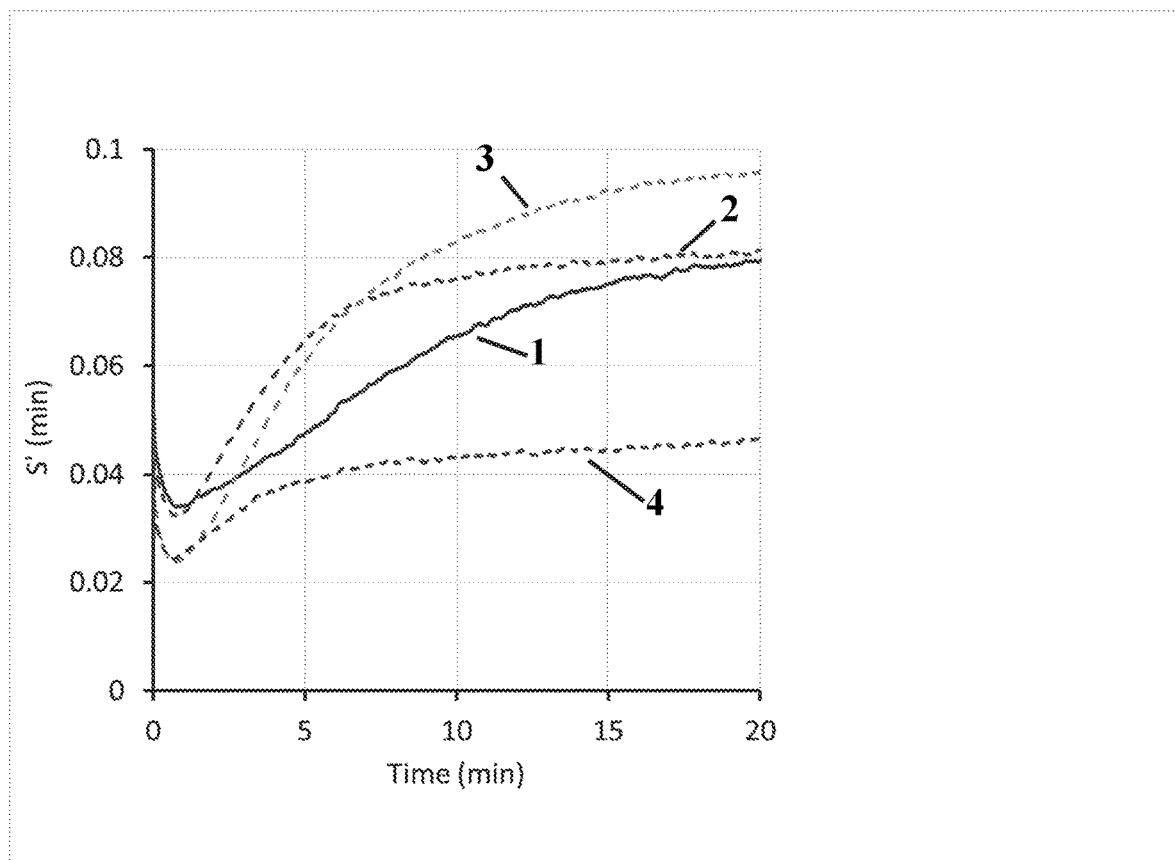
FIG. 3 shows cure behavior for a sealant composition including various cure modifiers.

As seen in FIG.-3, addition of dimethylphathalate (3) or dibutylmaleate (2) showed an enhancement in the cure of sealant as compared with control (1). Addition of ethylene glycol (4) showed an inhibiting effect on cure.

TABLE 2

|  | Sample No. | | | |
| --- | --- | --- | --- | --- |
|  | 1 | 2 | 3 | 4 |
| Butyl rubber[1] | 16.1 | 16.1 | 16.1 | 16.1 |
| Carbon black[2] | 8.5 | 8.5 | 8.5 | 8.5 |
| Polyisobutylene[3] | 67.8 | 65.7 | 65.7 | 65.7 |
| Benzoquinonedioxime[4] | 1.2 | 1.2 | 1.2 | 1.2 |
| Zinc oxide[5] | 1.4 | 1.4 | 1.4 | 1.4 |
| Dibenzoylperoxide[6] | 5 | 5 | 5 | 5 |
| Dimethylphthalate | 0 | 2 | 0 | 0 |
| Dibutylmaleate | 0 | 0 | 2 | 0 |
| Ethylene Glycol | 0 | 0 | 0 | 2 |

[1]Butyl 269 from ExxonMobil
[2]Vulcan M from Cabot
[3]Indopol H300
[4]Luxomaxx K-CDO
[5]French process
[6]Peroxan BP50 PF1 from Pergan, 50% by weight dibenzoylperoxide

TABLE 3

|  | Sample No. | | | |
| --- | --- | --- | --- | --- |
|  | 1 | 2 | 3 | 4 |
| Min Torque | 0.034 | 0.0323 | 0.0236 | 0.0242 |
| Max Torque | 0.0831 | 0.0826 | 0.0961 | 0.0468 |
| Delta Torque | 0.0491 | 0.0502 | 0.0725 | 0.0227 |
| T25, sec | 276 | 160 | 180 | 108 |
| T90, sec | 1062 | 686 | 757.8 | 805 |

What is claimed is:

1. A method making a pneumatic tire, comprising the steps of:
    mixing a sealant composition comprising an elastomer, a filler, a diluent, a quinoid curing agent, an oxidant co-curative; and a cure modifier of formula 1:

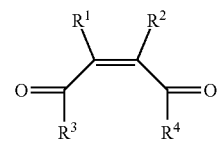

wherein $R^1$ and $R^2$ are independently H or C1 to C4 alkyl, or $R^1$ and $R^2$ taken together form a substituted or unsubstituted phenylene group; $R^3$ and $R^4$ are independently H, —OH —NH$_2$, C1 to C4 alkyl, or —OR$^5$ where $R^5$ is C1 to C4 alkyl, with the proviso that when $R^1$ and $R^2$ are taken together to form a substituted or unsubstituted phenylene group, $R^5$ is C1 to C3 alkyl;
    wherein the sealant composition further comprises a cure retarder selected from ethylene glycol, alkyl-substituted ethylene glycols, ethylene diamine, and alkyl-substituted ethylene diamines; and
    applying the sealant composition to an inner surface of a cured tire; and curing the sealant composition.

2. The method of claim 1, wherein the cure modifier is selected from the group consisting of phthalic acid, monoalkyl phthalates, dialkyl phthalates, phthalic acid monoamides, phthalic acid diamides, phthalaldehyde, and o-diacetylbenzene.

3. The method of claim 1, wherein the cure modifier is selected from the group consisting of dimethyl phthalate, diethylphthalate, and dipropylphthalate.

4. The method of claim 1, wherein the cure modifier is selected from the group consisting of maleic acid, monoalkyl maleates, dialkyl maleates, maleic acid monoamides, maleic acid diamides, citraconic acid, monoalkyl citraconate, dialkyl citraconates, citraconic acid monoamides, citraconic acid diamides, and 2-butenedial-2Z.

5. The method of claim 1, wherein the cure modifier is selected from the group consisting of dimethylmaleate, diethylmaleate, dipropylmaleate, and dibutylmaleate.

6. The method of claim 1, wherein the cure modifier is selected from the group consisting of trimellitic acid, monoalkyl trimellitates, dialkyltrimellitates, trialkyltrimellitates, hemimellitic acid, monoalkyl hemimellitates, dialky hemimellitates, trialkyl hemimellitates, pyromellitic acid, monoalkyl pyromellitates, dialkyl pyromellitates, trialkyl pyromellitates, and tetraalkyl pyromellitates.

7. The method of claim 1, wherein the elastomer is selected from the group consisting of butyl rubber, halogenated butyl rubber, EPDM, styrene-butadiene rubber, acrylonitrile-butadiene rubber, acrylonitrile-butadiene-styrene rubber, polybutadiene, natural rubber, and synthetic polyisoprene.

8. The method of claim 1, wherein the oxidant co-curative is selected from the group consisting of diaroyl peroxides, diacyl peroxides and peroxyesters.

9. The method of claim 1, wherein the quinoid is selected from the group consisting of benzoquinone dioxime, p,p-dibenzoylquinone dioxime, and dibenzoyl-p-quinone dioxime.

10. The method of claim 1, wherein the oxidant co-curative is benzoyl peroxide.

11. The method of claim 1, wherein the diluent is a low molecular weight elastomer with a number average molecular weight Mn ranging from 200 to 5,000.

12. The method of claim 1, wherein the sealant further comprises at least one of oil and resin.

13. The method of claim 1, wherein the diluent is polyisobutylene.

14. The method of claim 1, wherein the sealant composition further comprises from 1 to 10 phr of a metal oxide selected from zinc oxide, magnesium oxide, and calcium oxide.

15. The method of claim 1, wherein the step of mixing comprises the steps of:
combining the oxidant co-curative and a portion of the diluent to form a component A;
combining the remaining ingredients to form a component B; and
mixing component A with component B to form the sealant composition.

16. A pneumatic tire made by the method of claim 1.

* * * * *